Sept. 30, 1941. H. F. BAKEWELL 2,257,364
MACHINE TOOL
Filed Oct. 3, 1939   3 Sheets-Sheet 1

INVENTOR.
Harding F. Bakewell,
BY
ATTORNEY.

Sept. 30, 1941.  H. F. BAKEWELL  2,257,364
MACHINE TOOL
Filed Oct. 3, 1939  3 Sheets-Sheet 2
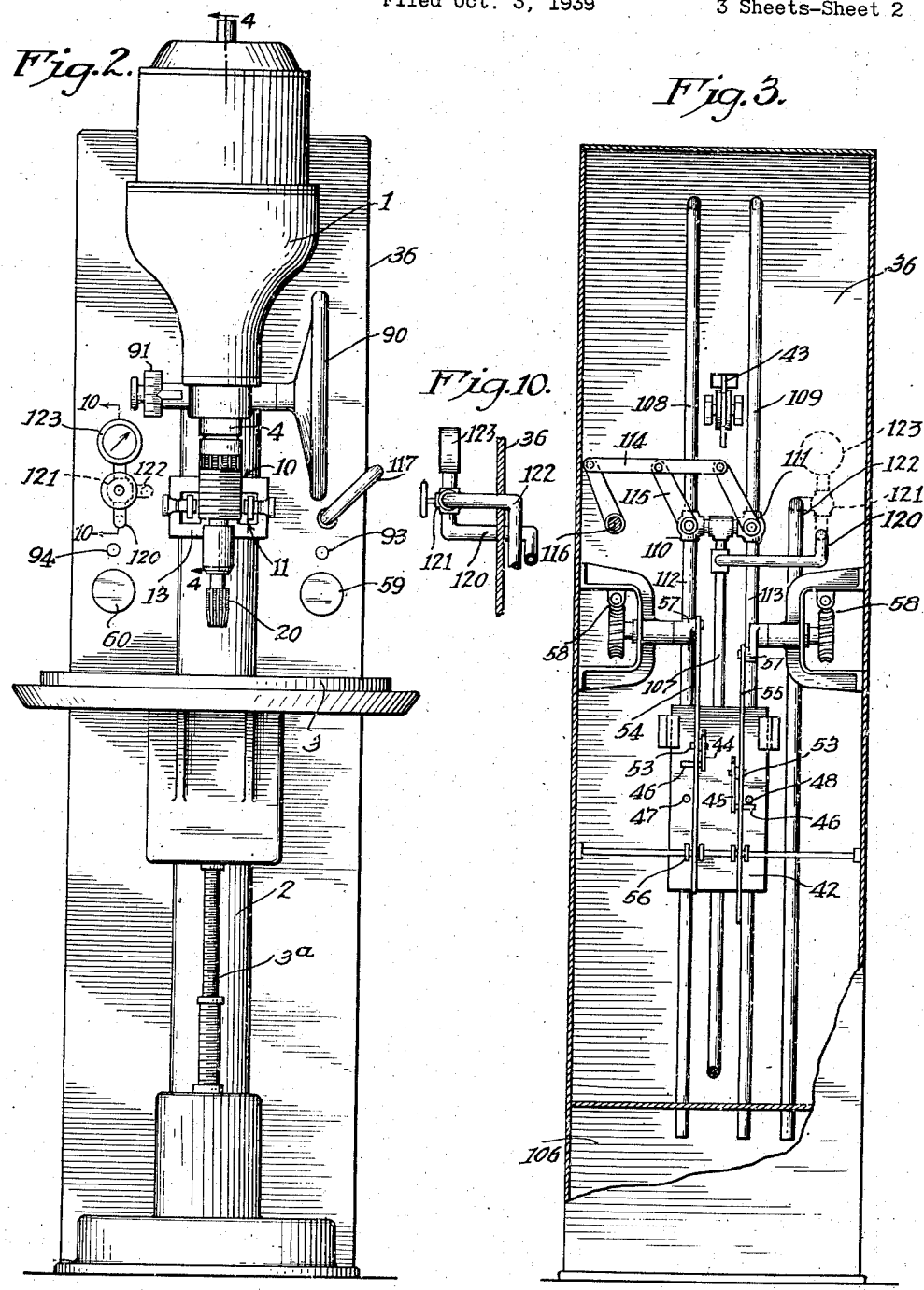
INVENTOR.
Harding F. Bakewell,
BY
ATTORNEY.

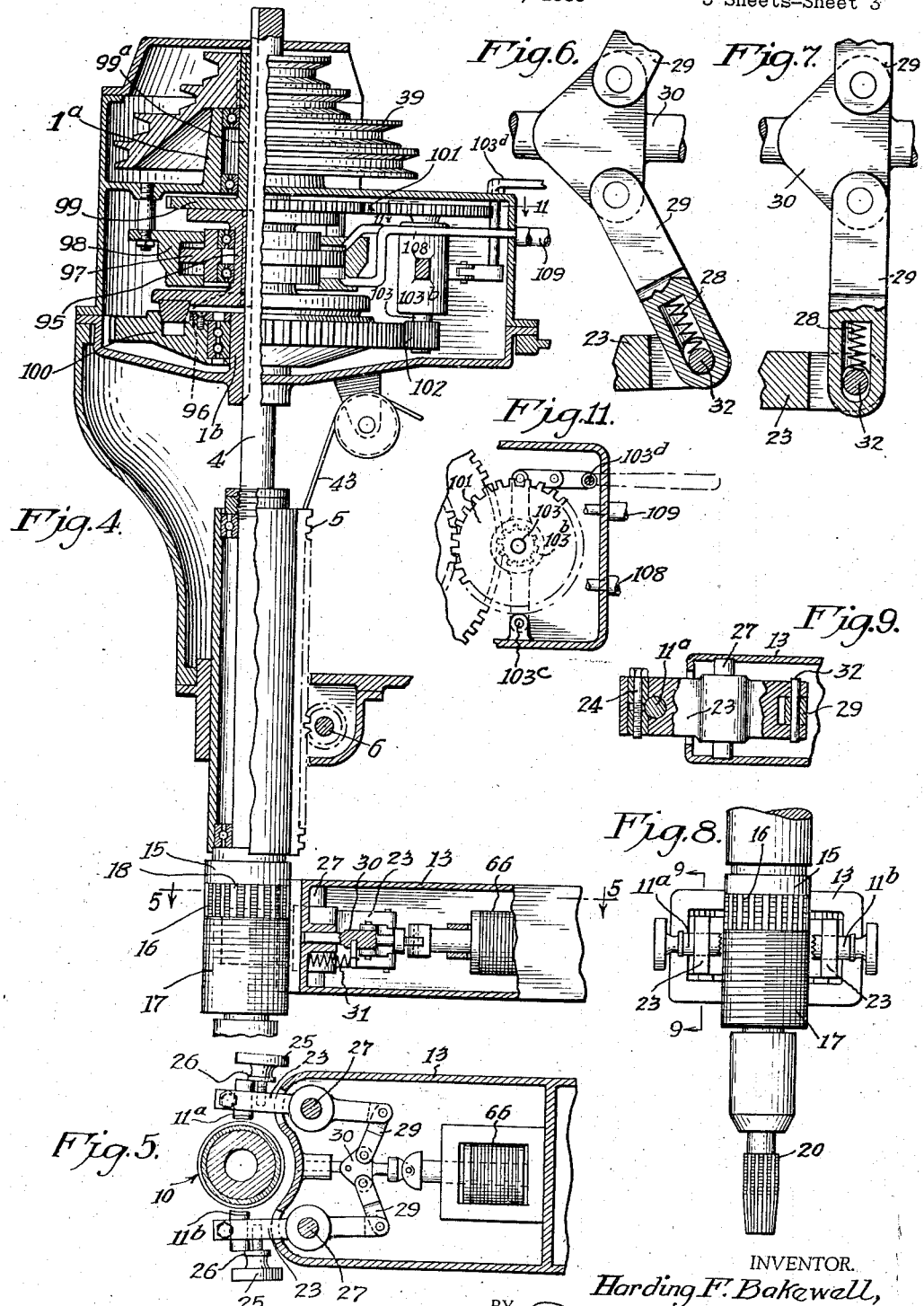

Patented Sept. 30, 1941

2,257,364

UNITED STATES PATENT OFFICE 2,257,364

MACHINE TOOL

Harding F. Bakewell, San Marino, Calif.

Application October 3, 1939, Serial No. 297,697

19 Claims. (Cl. 10—129)

This invention relates to machine tools in which operation of the tool is by relative rotation and relative axial feed of the tool element and the work, and is applicable to machine tools such as tapping, drilling or other machines in which the tool element is rotated relative to stationary work, or is applicable to machine tools such as thread-cutting or other machines in which the work is rotated and the tool element is non-rotatable; and the invention is also applicable to machine tools of the aforementioned types, in which relative axial feed is by axial displacement of either the tool element or the work.

It is an object of the invention to provide improved thread-leading means, applicable to either of the aforesaid types of machine tool.

More particularly, it is an object of the invention to provide a positive and uniformly accurate thread-lead by maintaining snug engagement between accurately interfitting and relatively rotatable threaded-guides.

As embodied in a machine in which the tool element is rotatable and adapted for axial movement relative to stationary work, e. g. a tapping machine, one of the cooperating threaded-guides is stationary and the other is rotatable with the tool spindle. Rotation of the tool spindle thus rotates the tool element, and also feeds it axially relative to the stationary work responsive to engagement between the cooperating and relatively rotating threaded-guides.

As embodied in a machine in which the tool is non-rotatable but is shiftable along relatively rotating work, e. g. a thread-cutting machine, one of the cooperating threaded-guides is the rotatable thread-lead screw of the machine and the other is the cooperating non-rotatable threaded block which responsive to rotation of the thread-lead screw is shifted along the same for feeding the non-rotatable tool element along the relatively rotating work.

It is a further object of the invention to provide for engagement and disengagement of the cooperating threaded-guides of the thread-leading means; and more particularly to provide a control for dependently engaging the threaded-guides and actuating the drive which relatively rotates the same, for thread-lead in one direction, preferably with automatic reversal of the rotary drive so as to reverse the thread-lead after predetermined lead in the first mentioned direction, and preferably with automatic and dependent disengagement of the threaded-guides and arresting of their rotary drive after predetermined thread-lead in the second mentioned direction.

It is a still further object of the invention to provide a rotary drive for a machine tool of either of the aforementioned types, with the rotary drive having variable speed selection controlled by fluid pressure.

It is a still further object of the invention to provide a fluid pressure engaged rotary drive, with the fluid pressure adjustable for yielding of the rotary drive at predetermined torque capacity of the machine.

It is a still further object of the invention to provide variable speed selection controlled by fluid pressure, with the fluid pressure adjustable for yielding of the rotary drive at predetermined torque capacity of the machine.

It is a particular object of the invention to incorporate one or more of the aforementioned improvements in a machine tool of the type in which one of the relatively rotating elements, i. e. the tool element or the work (preferably the tool element), is fixed for rotation with a spindle, and relative axial feed of the tool element and the work is preferably by axial displacement of the spindle, thereby adapting the machine for accurately and rapidly repeating a predetermined cycle of operation, for an internal or external threading operation, e. g. for successively tapping a series of bores.

The present application is a continuation in part of my copending application Ser. No. 234,056, filed October 8, 1938.

Further objects of the invention will be readily understood from the following description of the accompanying drawings which illustrate a form which the invention may assume in practice, it being understood that the form which is shown and described is for purpose of illustration, and that the invention may be modified and is entitled to various forms without departing from the scope of the appended claims.

In the drawings:

Fig. 2 is a front elevation of the machine.

Fig. 3 is a vertical section on the line 3—3 of Fig. 1.

Fig. 4 is an enlarged axial section on the line 4—4 of Fig. 2.

Fig. 5 is a horizontal section on the line 5—5 of Fig. 4.

Figs. 6 and 7 are detail plan views of the linkage of Fig. 5, respectively showing different shifted positions of the same.

Fig. 8 is a front elevation of the thread-leading means.

Fig. 9 is a vertical section on the line 9—9 of Fig. 8.

Fig. 10 is a vertical section on the line 10—10 of Fig. 2.

Fig. 11 is a horizontal section on the line 11—11 of Fig. 4.

Figure 1:
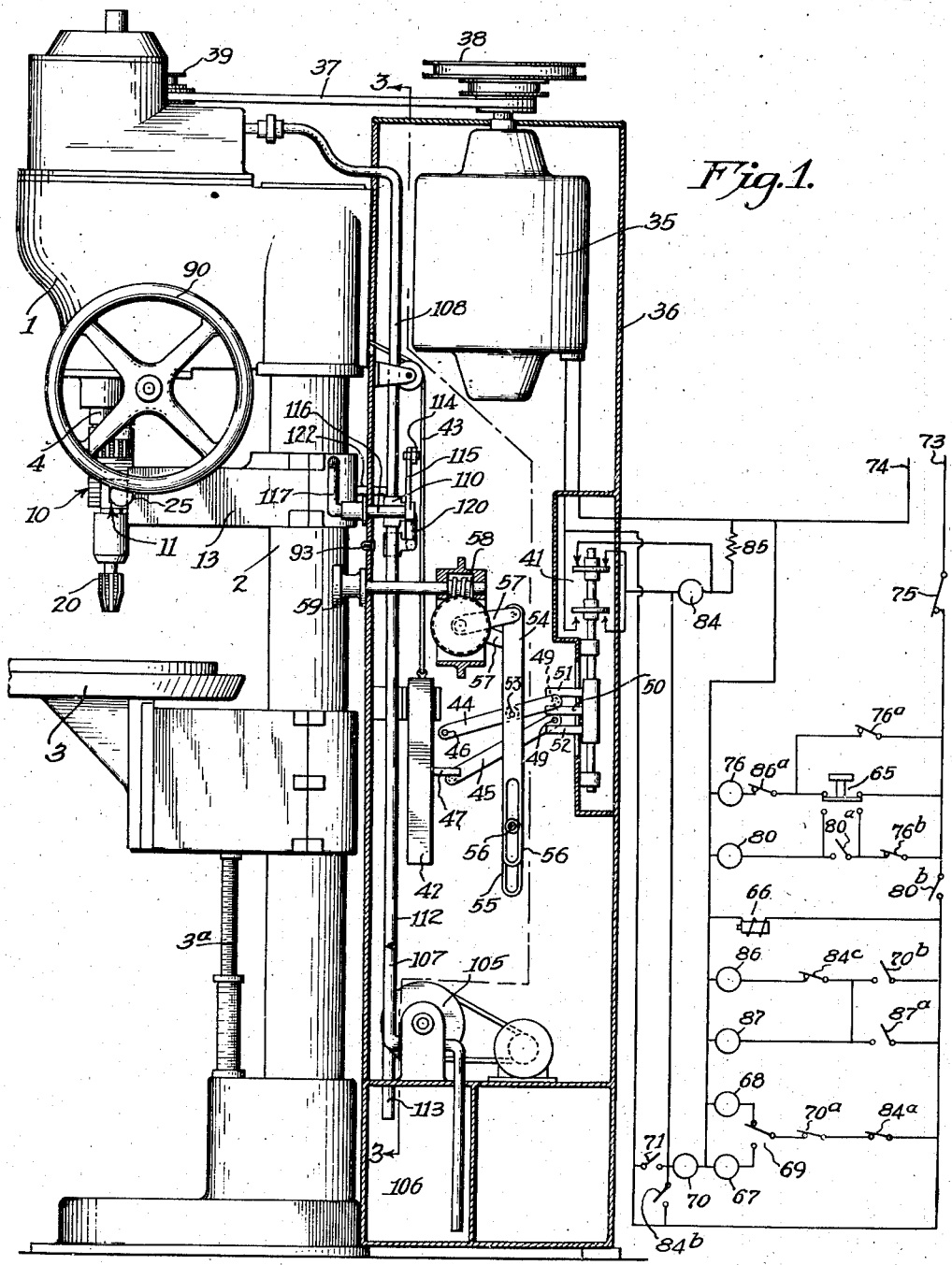
Fig. 1 is a side elevation of the invention as embodied in a tapping machine, partly in vertical section, and diagrammatically illustrating electrical means for controlling operation of the machine.

That feature of the invention which provides improved thread-leading means will first be described. The thread-leading means comprises relatively rotatable and interfitting threaded-guides. The drive for relatively rotating the cooperating threaded-guides may be a rotary drive for the tool element, e. g. the tool spindle of a machine; or the drive for relatively rotating the cooperating threaded-guides may be some other rotary drive of a machine, e. g. the rotary drive for the thread-lead screw of a thread-cutting machine. It will thus be understood that except where otherwise specified, reference herein to a drive for relatively rotating cooperating threaded-guides of a thread-leading means, or words of similar import, relate to a construction wherein the threaded-guides are relatively rotated by rotation of a tool spindle or by some other rotating element of the machine.

The improved thread-leading means is particularly applicable and is therefore illustrated and described as applied to a machine tool in which the tool element and the work are relatively rotated by fixing one of the relatively rotating elements to a rotatable spindle, and in which the cooperating threaded-guides are relatively rotated by rotation of the spindle, e. g. a tapping machine in which a tool spindle is adapted for rotation and axial feed relative to stationary work, with one of the cooperating threaded-guides fixed for rotation and axial displacement with the tool spindle.

As an instance of such a tapping machine, a spindle frame 1 is mounted on a column 2, and a work table 3 is vertically adjustable on the column 2 relative to the spindle frame by a screw 3a. A tool spindle 4 is rotatable in the frame 1 and is also axially movable relative to the spindle frame and the work table, either by a manually operated rack and pinion 5—6 or by the improved thread-leading means.

The improved thread-leading means comprises relatively rotatable threaded-guides providing accurate interfitting of their threads and adapted to maintain snug threaded engagement throughout their relative rotation. The machine in which the thread-leading means is incorporated includes a drive for relatively rotating the threaded-guides.

As embodied in a tapping machine in which the tool is rotatable and adapted for thread-lead relative to stationary work, one of the threaded-guides is an externally threaded element 10 which is adapted for rotation and the other threaded-guide is a stationary element 11 having an internal thread which is adapted for engagement by the thread of the element 10. In the illustrated embodiment, the element 10 is mounted on the tool spindle 4 for rotation therewith and the element 11 is mounted on a frame 13 which may be adjustably mounted on the column 2 for properly positioning the stationary element 11 relative to the rotatable element 10.

The element 10 preferably includes means for first cutting the desired thread in the element 11, and for thereafter making threaded engagement with the thread which has thus been cut in the element 11, so that rotation of the element 10 by the tool spindle 4 will axially feed the rotating tool spindle in accordance with the thread-lead 10—11.

As an instance, the element 10 comprises a sleeve which is detachably mounted on the lower end of the spindle 4 for rotation with the spindle; and the external periphery of the sleeve preferably includes an upper end portion 15 which forms a smooth gauging diameter for properly positioning the element 11 relative to the element 10, an intermediate thread-cutting portion 16 for cutting threads in the element 11, and a lower end portion 17 which has a thread corresponding to the threads which have been cut in the element 11. In order to provide this combination of thread-cutter 16 and pilot thread 17, the sleeve has a thread along its portions 16—17 corresponding to the desired thread-lead, with the thread continuous along the portion 17, but interrupted by cutting flutes 18 along the portion 16.

The tapping tool, which is to be rotated by the spindle 4 and which is to be fed axially by threaded engagement of the pilot thread 17 with the cooperating thread of the element 11, is shown at 20. The tap is detachably suspended from the spindle 4 in usual manner, and has a lead corresponding to the lead of the cooperating threaded-guides 10—11.

The element 11, which by means of the thread-cutter 16 is threaded to correspond to the pilot thread 17, is maintained in snug threaded engagement with the element 10 throughout cutting of the thread in the element 11 and throughout subsequent threaded engagement of the pilot thread 17 with the thread of the element 11. By maintaining this snug engagement, the thread which is cut in the element 11 corresponds exactly to the pilot thread 17, and uniformly accurate threaded engagement without back-lash is maintained throughout relatively rotatable engagement of the pilot thread 17 with the thread of the element 11, thereby providing a uniformly accurate thread-lead for the tap 20.

As an instance of means for maintaining snug threaded engagement between the threaded-guides 10—11, the element 11 preferably comprises a pair of blocks 11a—11b (Figs. 5 and 8) which preferably engage the periphery of element 10 at diametrically opposite points, and which are supported by arms 23 which are mounted on the frame 13. The blocks 11a—11b may be detachably clamped in their supporting arms as shown at 24 (Fig. 9), and may be adjusted relative to their supporting arms by nuts 25 which have shoulders 26 which are adapted to impinge the ends of the blocks 11a—11b. The supporting arms 23 are medially pivoted to the frame 13 as shown at 27, and the pivoted arms are adapted to be swung so as to tension engagement of the blocks 11a—11b with the cooperating element 10, or are adapted to be swung in the opposite direction so as to shift the blocks clear of said cooperating element. For this purpose, the arms 23 are pivoted to links 29 which are in turn pivoted to an actuating rod 30. A spring 31 tends to project the rod 30 for swinging the arms 23 so as to shift the blocks 11a—11b clear of the cooperating element 10 (Fig. 6); and by retracting the rod 30 against the tension of its spring 31 the arms 23 are swung so as to engage the blocks 11a—11b with the cooperating element 10 (Fig. 7).

The rod 30 is preferably retracted by energizing a solenoid 66; and engagement of the blocks with the cooperating element 10 is preferably tensioned so as to maintain snug engagement. This tensioning may be obtained by the force exerted by the energized solenoid, but in practice, it is preferable to provide positive tensioning means, shown as springs 28, which may be mounted in bores in the links 29, with slotted pivotal connections 32 between the arms 23 and the links. The rod 30 is thus adapted to swing the arms for operatively or inoperatively positioning the blocks 11a—11b; and when the arms have shifted the blocks to operative position, the rear ends of the arms are clear of fixed abutments such as would limit their swing, so that further swinging of the arms is permitted for tightening or relieving the engagement of the blocks with the cooperating element 10. The force exerted by the energized solenoid 66, or preferably the force exerted by the springs 28, urges such further swinging of the arms for maintaining snug engagement of the blocks with their cooperating element 10.

Means are preferably provided for dependently controlling rotation of the tool spindle 4 and retraction or projection of the rod 30 which causes engagement or disengagement of the cooperating threaded-guides 10—11. By this control (hereinafter described) the tool spindle 4 is rotated and the rod 30 is retracted so as to engage the cooperating threaded-guides 10—11. The cooperating threaded-guides thus provide a positive lead for the rotatable tap 20. When work has been tapped to the desired depth, rotation of the spindle 4 is reversed and the cooperating threaded-guides 10—11 provide a positive lead for withdrawing the reversely rotating tap. When the tap is clear of the work, rotation of the spindle 4 is arrested and the rod 30 is projected so as to disengage the cooperating threaded-guides 10—11. If desired, elevation of the tool spindle 4 may then be continued by its rack and pin connection 5—6, independently of the disengaged thread-lead 10—11.

As an instance of means for reversing rotation of the tool spindle when the tap has been fed a predetermined distance into the work, the tool spindle may be rotated by an electric motor 35 which is preferably housed in a casing 36 in rear of the column 2. The motor 35 preferably drives the spindle 4 through a belt drive 37 which cooperates with pulleys 38—39 on the motor shaft and on the tool spindle respectively. The pulley 39 has a driving connection with the spindle 4 for rotating the spindle and permitting axial movement thereof. The motor 35 is reversible for rotating the spindle 4 in either of opposite directions; and a two-way electrical switch 41 is preferably actuated by predetermined axial shifting of the tool spindle for controlling reversal of the motor.

When the switch 41 is in the position shown at Fig. 1 and the control (hereinafter described) has been operated for starting the motor 35, the spindle 4 is rotated in the direction whereby the thread-leading means 10—11 feeds the tap 20 into the work. When the two-way switch 41 is shifted to its other position, rotation of the motor 35 is reversed so that it rotates the tool spindle in the direction whereby the thread-leading means 10—11 withdraws the reversely rotating tap from the work. The switch 41 is preferably automatically shifted at predetermined limits of axial movement of the tool spindle in its respective opposite directions.

For this purpose, an element 42 which may be a counterweight for the tool spindle 4 is shiftable in the casing 36 responsive to axial movement of the spindle, preferably through a cable connection 43; and an actuating connection is provided between the element 42 and the two-way switch 41. The actuating connection comprises a pair of levers 44—45 which are medially pivoted, with the ends 46 of the levers respectively adapted for engagement by pins 47—48 of the element 42 and with the ends 49 of the levers respectively adapted to engage a pin 50 of the two-way switch 41. The ends 46—49 of the lever 44 respectively overlie the pins 47—50 so that terminal upward movement of the element 42 (responsive to downward travel of the tool spindle 4) swings the lever 44 for shifting the switch 41 to its position opposite to that shown at Fig. 1; and the ends 46—49 of the lever 45 respectively underlie the pins 48—50 so that terminal downward movement of the element 42 (responsive to upward travel of the tool spindle 4) swings the lever 45 for shifting the switch 41 to the position shown at Fig. 1. Pins 51—52 may respectively overlie and underlie the ends 49 of the levers 44—45 for maintaining operating engagement of said lever-ends with the pin 50.

This actuating connection for reversing rotation of the tool spindle is preferably adjustable for operation at predetermined limits of axial travel of the spindle in each of its opposite directions. For this purpose, the medial pivots 53 of the levers 44—45 are adjustable relative to the elements 41—42, whereby the pin 47 engages and swings the lever 44 at predetermined upward travel of the element 42 and the pin 48 engages and swings the lever 45 at predetermined downward travel of said element. As an instance of this arrangement, the levers 44—45 are medially pivoted to arms 54—55 which are vertically adjustable in the casing 36 between the elements 41—42, with adjustment of the arms guided as shown at 56 and with the arms each vertically adjustable by a manual control.

The manual control for each of the arms 54—55 preferably comprises a lever 57 pivoted to the upper end of its cooperating arm, with each lever adapted to be swung to desired position by a worm drive 58. The worm drives are provided with manual controls 59—60 which are accessible to the operator at the front of the casing 36 for respectively adjusting the medial pivots 53 of the levers 44—45.

The wiring diagram of Fig. 1 illustrates a suitable control for cyclic operation of the tapping machine, the parts being shown in position ready for start of cyclic operation, with the motor 35 at rest, and with the switch 41 ready for rotation of the motor in the direction for tapping operation by the tool, and with the spindle 4 at terminal upward travel ready for downward feed of the tap into the work, and with the thread-leading means 10—11 disengaged but ready for engagement for downwardly feeding the spindle when the motor 35 is started.

This electrical control includes a switch 65 which is manually operated to start the cycle of operation and which is so arranged that after once started the cycle of operation continues to completion and then stops, irrespective of the position of the switch 65. The electrical control also includes the solenoid 66 which is energized throughout the cycle of operation and which retracts the rod 30 so as to engage the thread-leading means 10—11, the solenoid being deenergized at the end of the cycle of operation so that the spring 31 then projects the rod 30 for disengaging the thread-leading means and maintaining the same in inoperative position until the switch 65 is again actuated.

The reversible motor 35 is preferably a two-speed motor, and the electrical control preferably includes relays 67—68 which are controlled by a manually operated selector switch 69 for respectively driving the motor at high or low speed in that direction in which the thread-leading means 10—11 will feed the tap 20 into the work. The electrical control also includes a relay 70 for driving the motor at high speed in the reverse direction in which the thread-leading means 10—11 will withdraw the tap from the work. An emergency switch 71 is preferably also included in the electrical control, and is arranged so that when closed at any time during the cycle of operation and then held in closed position until the cycle of operation is completed, the relay 70 will be energized for withdrawing the tap from the work and the cycle of operation will continue to completion, and will then stop independently of reopening of the switch 71.

As an instance of an electrical control embodying the aforementioned features, electrical energy may be supplied from any suitable source via leads 73—74 and thence via a master switch 75 which is closed when the tapping machine is to be operated. The switch 65 being in position closing its upper contacts, closing the switch 75 energizes a pilot relay 76, via the normally closed upper contacts of the switch 65 and via a normally closed contact 86a; and when energized the pilot relay closes the normally open contacts 76a—76b.

When the switch 65 is then manually depressed to start the cycle of operation, its upper contacts are opened but the closed contact 76a continues to energize the relay 76; and the lower contacts of the switch 65 are closed for energizing a relay 80 via the closed contact 76b and via the closed lower contacts of the switch 65. The relay 80, when energized, closes contacts 80a—80b. The switch 65 may then be returned to its original position, with the closed contact 80a continuing to energize the relay 80, and with the closed contact 80b continuing the cycle of operation to completion.

The closed contact 80b energizes the solenoid 66, which when energized actuates the rod 30 for causing operative engagement of the thread-leading means 10—11; and via the normally closed contacts 84a—70a the closed contact 80b also energizes either the relay 67 or 68 (depending upon the previously selected position of the switch 69). The motor 35 is thus driven at either high or low speed (depending upon relay 67 or 68 having been energized), this rotation being in the direction for rotating the spindle 4 so that the engaged thread-leading means 10—11 feed the rotating tap 20 into the work.

When the tap 20 has been fed into the work a predetermined distance, the pin 47 engages the lever 44 and shifts the two-way switch 41 from the position shown at Fig. 1 to its opposite limit of movement, thereby opening the upper contacts and closing the lower contacts of this switch.

Closing the lower contacts of the switch 41 completes a circuit via a relay 84 and a resistor 85; and energizing the relay 84 opens the normally closed contact 84a, thereby breaking the circuit to the selector switch 69 and thus stopping the motor 35. Energizing the relay 84 also closes a normally open contact 84b, thereby energizing the relay 70 for rotating the motor 35 at high speed in the reverse direction. The motor thus rotates the spindle 4 in the direction whereby the engaged thread-leading means 10—11 withdraw the rotating tap 20 from the work. Energizing the relay 70 also opens the contact 70a so that the circuit to the selector switch 69 is broken at the contact 70a as well as at the contact 84a.

When the tap has been retracted a predetermined distance, sufficient to clear the work, the pin 48 engages the lever 45, and shifts the two-way switch 41 to the position shown at Fig. 1, thereby closing the upper contacts and opening the lower contacts of this switch.

Closing the upper contacts of the switch 41 closes a circuit around the relay 84 for shunting out the relay through the resistor 85. When the relay 84 is thus deenergized, the contact 84b opens, thereby breaking the circuit to the relay 70 and thus stopping the motor 35. By thus deenergizing the relays 70—84, the contacts 70a—84a close to normal position; but the circuit via these closed contacts 84a—70a to the selector switch 69, is broken by opening the contact 80b.

The contact 80b is opened even if the operator should have failed to return the switch 65 to its position closing its upper contacts and opening its lower contacts. Opening the contact 80b deenergizes the solenoid 66, thereby permitting spring projection of the rod 30 for disengaging the thread-leading means 10—11; and opening the contact 80b also breaks the circuit to the motor-control relays 67—68—70, so as to prevent restarting of the motor 35. The cycle of operation having thus been completed, it is prevented from repeating until the operator has returned the switch 65 to position closing its upper contacts (thereby positioning the parts ready for starting the cycle of operation as previously described) and then depresses the switch 65 for opening its upper contacts and closing its lower contacts.

As an instance of means for insuring opening of the contact 80b at the end of the cycle of operation and irrespective of the position of the switch 65, a relay 86 controls the contact 86a and at the end of the cycle of operation is energized via contacts 87a—84c, the contact 84c being controlled by the relay 84 and the contact 87a being controlled by a relay 87. The relay 87 is controlled via a contact 70b which is controlled by the relay 70.

At the start of the cycle of operation the contact 84c is in normal closed position and the contacts 70b—87a are in normal open position. The relays 86—87 are thus deenergized and contact 86a is in normal closed position. At the end of downward travel of the tap 20, at which time the relays 70—84 are energized as previously described, the relay 84 opens the contact 84c (to prevent the relay 86 being energized) and the relay 70 closes the contact 70b so as to energize the relay 87, thereby closing the contact 87a. The relay 87 then remains energized and the contact 87a remains closed during upward travel of the tap 20.

At the end of upward travel of the tap and at which time the relays 70—84 are deenergized as previously described, deenergizing the relay 84 permits contact 84c to close, thereby energizing the relay 86 via closed contacts 87a—84c; and the deenergized relay 70 permits contact 70b to open. The energized relay 86 opens the normally closed contact 86a, thereby deenergizing the relay 76 whether the switch 65 is closing its upper or lower contacts; and deenergizing the relay 76 permits opening of contacts 76a—76b, thereby deenergizing the relay 80 whether the switch 65 is closing its upper or lower contacts. Deenergizing the relay 80 permits contacts 80a—80b to open; and opening the contact 80b deenergizes the solenoid 66 and interrupts the circuits to the motor controlling relays 67—68—70 so that all operation is arrested at the end of each cycle. Opening the contact 80b also breaks the circuit to relays 86—87, thereby permitting contact 86a to close and contact 87a to open.

The parts are then in the position first described, whereby closing the switch 65 at its upper contacts again energizes the relay 76 so as to prepare for repeating the cycle of operation; and shifting the switch 65 so as to close its lower contacts then repeats the cycle of operation.

The emergency switch 71 may be closed at any time during the cycle of operation; and whenever closed and held in closed position until the end of the cycle, energizes the relay 84 so as to open contact 84a and thus stop rotation of the motor 35 in the direction for downward feed of the tap 20, and also energizes the relay 70 for rotating the tool spindle in the reverse direction for withdrawal of the tap from the work. At the end of the cycle of operation and whether or not the emergency switch 71 is opened, the relay 84 is shunted out by the switch 41 being shifted to position closing its upper contacts, thereby closing the contact 84c and thus opening the contact 80b (as previously described) for arresting all operation irrespective of the position of the switch 65.

When operating the tapping machine, the work is placed on the table 3 and a hand wheel 90 of the rack and pinion connection 5—6 is rotated for lowering the tool spindle 4 until the tap 20 contacts the work. With the tool spindle in this position an index 91 for the hand wheel 90 is set at zero. The work is then removed from the table 3 and by rotating the hand wheel 90 the tool spindle is lowered that distance (indicated by the index 91) which it is desired to feed the tap into the work. With the tool spindle in this position, the manual control 59 is rotated for shifting the pivot 53 of the lever 44 to position where the lever, when its pin 46 is engaged by the pin 47, is swung so that its pin 49 shifts the two-way switch 41 for closing its lower contacts. By rotating the hand wheel 90 in the reverse direction the tool spindle is then elevated to position in which the tap 20 clears the work. With the tool spindle in this position, the manual control 60 is rotated for shifting the pivot 53 of the lever 45 to position where the lever, when its pin 46 is engaged by the pin 48, is swung so that its pin 49 shifts the switch 41 for closing its upper contacts.

Suitable means may be provided for indicating when adjustment of the controls 59—60 has properly positioned the pivots 53 of the levers 44—45; and for this purpose visible indicators such as electric lamps 93—94 may be associated with the respective controls 59—60. Through suitable electrical connections (not shown) the lamps 93—94 are in circuit with the lower and upper contacts respectively of the switch 41, so that when the control 59 has adjusted the lever 44 for closing the lower contacts of the switch 41 at predetermined downward travel of the tool spindle, the lamp 93 is illuminated, and when the control 60 has adjusted the lever 45 for closing the upper contacts of the switch 41 at predetermined upward travel of the tool spindle, the lamp 94 is illuminated.

The frame 13 is adjusted on the column 2 so that the pilot thread 17 will make threaded engagement with the blocks 11a—11b throughout that axial movement of the tool spindle 4 which has been predetermined by adjustment of the controls 59—60; and with the parts in the position shown at Fig. 1 the machine is then ready for cyclic operation each time the switch 65 is depressed, with operation completely arrested at the end of each cycle and until the switch 65 (having been first returned to its normal position closing its upper contacts) is again depressed for repeating the cycle of operation.

Prior to operating the tap 20 as thus described, the blocks 11a—11b (without threads cut therein) are mounted in the arms 23 and by the gauging diameter 15 of the element 10 are adjusted to proper position with relation to said element. The tool spindle is then rotated as previously described, so that the thread-cutting portion 16 of the element 10 cuts corresponding threads in the blocks 11a—11b, the lead for the rotating cutter 16 being obtained by its threaded engagement with the thread which it is cutting in the blocks 11a—11b. While threads are thus being cut in the blocks 11a—11b the springs 28 urge the blocks into snug engagement with the cutting-thread 16, thereby insuring the threads which are cut in the blocks being accurate counterparts of the thread 16—17; and when, during subsequent operation of the machine, the pilot thread 17 rotatably engages the threaded blocks 11a—11b to provide a thread-lead for the tap 20, the springs 28 maintain snug threaded engagement of the cooperating threaded-guides 10—11 so as to provide an accurate and uniform thread-lead for the tap 20, with no back lash during reversal of the tapping operation.

Another feature of the invention is the provision of variable speed selection for any desired rotary drive of a machine tool, with the variable speed selection adapted for operation by fluid pressure. This feature is particularly applicable to a machine tool in which one of relatively rotating elements, i. e. the tool element or the work (preferably the tool element), is fixed for rotation with a spindle which provides the rotary drive for operating the machine; and this feature of the invention is therefore illustrated in connection with the tapping machine which has been previously described.

As an instance, the variable speed mechanism is mounted in the spindle frame 1 and the control for its fluid pressure actuating means is mounted in the casing 36. The spindle 4 is adapted for rotation by a clutch member 95 (Fig. 4) which is keyed to the spindle 4 as shown at 96 so as to rotate the spindle with the clutch member and at the same time permit axial movement of the spindle. The clutch member 95 is journaled in a piston 97 and is adapted for axial shifting by axial adjustment of the piston in a cylinder 98; and when shifted in one direction the clutch member 95 engages a cooperating clutch member 99 as shown at Fig. 4, and when shifted in the opposite direction engages a co-operating clutch member 100.

The clutch members 95—99, when engaged, provide a direct or high-speed drive for the spindle 4. For this purpose, the clutch member 99 may have an extension 99a journaled in a bearing 1a of the frame 1, with the spindle 4 extending through the extension 99a and with this extension keyed to the pulley 39 which surrounds the upper end of the same.

The clutch members 95—100, when engaged, provide a low-speed drive for the spindle 4. As an instance, a shaft 103 may be journaled in a bearing 103b which is mounted in the frame 1, with an intermediate gear 101 fixed on one end of the shaft and meshing with a gear at the periphery of the clutch member 99, and with a pinion 102 fixed on the other end of the shaft and meshing with a gear at the periphery of the clutch member 100. The clutch member 100 may be journaled on a bearing 1b of the frame 1 through which the spindle 4 extends.

The speed-reduction gearing 101—102 is engaged with the geared peripheries of the clutch members 99—100 when low-speed drive 95—100 is employed; and this speed-reduction gearing may be disengaged from said geared peripheries when direct or high-speed drive 95—99 is employed. For this purpose the bearing 103b may be pivoted in the frame 1 as shown at 103c (Fig. 11), whereby the bearing may be swung for simultaneous engagement or disengagement of the intermediate gear and pinion 101—102 with the geared peripheries of the clutch members 99—100. The bearing 103b may be swung by an operating connection which has a manual control 103d (Fig. 4).

The piston 97 is adapted for shifting by fluid pressure for engaging the high-speed drive 95—99 or the low-speed drive 95—100; and for this purpose is adapted for axial movement by fluid pressure which is selectively supplied to one face or the other of the piston 97. Fluid pressure may be generated by a pump 105 which is mounted in the casing 36 and which is adapted to draw fluid, preferably a suitable liquid, from a sump 106 and supply the fluid under pressure via conduit 107. From the conduit 107 the fluid pressure is selectively supplied via conduits 108 or 109 to the cylinder 98 at the lower or upper face of the piston 97, with the conduit which is not supplying fluid pressure providing for relief of pressure from the opposite face of the piston.

For this purpose, the supply conduit 107 branches to three-way valves 110—111 (Fig. 3) which are respectively connected to the conduits 108—109 and which are also respectively connected to return conduits 112—113 which lead to the sump 106. In one position, each of the valves 110—111 provides connection between the supply conduit 107 and the conduit 108 or 109 which is connected to that valve, while closing the return conduit 112 or 113 which is connected to that valve; and in its other position each of the valves closes communication with the supply conduit 107, while opening communication between the conduits 108—112, or the conduits 109—113, which are connected to that valve. The valves 110—111 are dependently operated so that when one is in its first mentioned position the other is in its second mentioned position; and for this purpose the valves may be operated via link connections 114—115, by a shaft 116 which extends to the front of the casing 36 where it is manually controlled as shown at 117 (Fig. 2). By shifting the control 117 to one position, fluid pressure is thus supplied to the lower face of the piston 97 for engaging the clutch members 95—100 for high-speed drive of the spindle 4, and by shifting the control 117 to its other position fluid pressure is supplied to the upper face of piston 97 for engaging the clutch members 99—100 for low-speed drive of the spindle 4.

Another feature of the invention is incorporation in any desired rotary drive of a machine tool, of means adapted to yield and disengage the rotary drive at any predetermined torque capacity of the machine, with the yieldable means operated by fluid pressure. This feature is particularly applicable to a machine tool in which one of relatively rotating elements, i. e. the tool element or the work (preferably the tool element), is fixed for rotation with a spindle which provides the rotary drive for operating the machine; and this feature of the invention is therefore illustrated in connection with the tapping machine which has been previously described. This feature of fluid pressure operated torque control is also particularly applicable to a fluid pressure operated variable speed selection such as previously described, since fluid pressure is thus adapted to operate the variable speed selection and is also adapted to yield and disengage the driving connection responsive to predetermined excessive torque. The fluid pressure operated torque control is therefore illustrated in connection with the previously described fluid pressure operated variable speed selection.

As an instance, the fluid pressure which is selectively supplied via conduit 108 or 109 for high or low-speed drive, is adapted for adjustment of the fluid pressure so as to permit yielding and disengagement of the engaged clutch members 95—100 or the engaged clutch members 95—99, at any predetermined torque capacity of the machine. For this purpose, a by-pass 120 leads from the supply conduit 107 and thence via valve 121 (Fig. 10) to a return conduit 122 which leads to the sump 106, the valve 121 being accessible to the operator at the front of the casing 36 and the by-pass 120—122 being provided with a pressure gauge 123. By adjusting the valve 121 and thus regulating by-pass of fluid pressure via 120—122, any desired pressure, as indicated by the gauge 123, may be maintained against piston 97 for engaging either the clutch 95—100 or the clutch 95—99. In the event of resistance to rotation of the spindle 4 exceeding predetermined torque capacity, as regulated by the valve 121 and as indicated by the gauge 123, the piston 97 will thus yield against the fluid pressure exerted against the same, thereby disengaging the driving connection for the spindle 4 at the clutch 95—100 or at the clutch 95—99, whichever has been engaged.

I claim:

1. In a machine tool, a driven element, a pair of gears, means for driving one of the gears, a clutch between the other gear and the driven element, a bearing, intermediate gearing journaled in the bearing, and means for shifting the bearing for engagement or disengagement of the intermediate gearing with the pair of gears.

2. In a machine tool, a tapping spindle, a driving gear, means for rotating the driving gear, a low speed gear, a clutch between the low speed gear and the tapping spindle, a bearing, an intermediate gear and a pinion journaled in the bearing for rotation of the pinion by the intermediate gear, and means for shifting the bearing for engagement or disengagement of the intermediate gear and the pinion with the driving gear and the low speed gear respectively.

3. In a machine tool, a rotatable tapping spindle, a thread-leading element associated with the tapping spindle, a support adjacent the thread-leading element, arms shiftable relative to the support, threaded blocks mounted in the respective arms for circumferentially spaced engagement with the thread-leading element for centering the thread-leading element relative to the blocks, means for adjusting the threaded blocks relative to their arms and relative to the thread-leading element, and means for shifting the arms to engage the threaded blocks with the thread-leading element.

4. In a machine tool, a rotatable and axially movable spindle, reversible driving means for rotating the spindle, thread-leading means for axially moving the spindle responsive to its rotation, a counterweight movable responsive to axial movement of the spindle, and a control for reversing the driving means responsive to movement of the counterweight.

5. In a machine tool, an axially movable spindle, a counterweight movable responsive to axial movement of the spindle, an electrical control circuit, a switch in said circuit, and means for actuating the switch responsive to movement of the counterweight so that the control circuit limits axial movement of the spindle.

6. In a machine tool, a rotatable spindle, clutch members surrounding the spindle and rotatable relative thereto, means for differentially rotating the clutch members, a clutch member surrounding the spindle between the first mentioned clutch members and fixed for rotation with but axially displaceable relative to the spindle, and fluid pressure means for axially displacing the second mentioned clutch member for selectively engaging the first mentioned clutch members.

7. In a machine tool, a rotatable spindle, a clutch member surrounding the spindle and rotatable relative thereto, means for rotating the clutch member, a second clutch member surrounding the spindle and fixed for rotation with but axially displaceable relative to the spindle, fluid pressure means for axially displacing the second clutch member in the direction for operatively engaging it with the first clutch member to provide a driving connection for the spindle, the second clutch member being axially displaceable in the opposite direction for disengaging the driving connection responsive to torque resistance of the spindle exceeding the fluid pressure, and means for regulating the fluid pressure.

8. In a machine tool, a rotatable tapping spindle, thread-leading means associated with the spindle, a rotary drive for the spindle including high and low-speed driving connections, a clutch actuated by fluid pressure for selectively engaging the driving connections, the clutch being yieldable for disengaging the selected driving connection responsive to torque resistance of the spindle exceeding the fluid pressure, means for regulating the fluid pressure to limit torque capacity of the spindle, and means for indicating the regulated torque capacity.

9. In a machine tool, a tapping spindle rotatable relative to the work, a thread-leading means associated with the spindle, a cooperating thread-leading means adapted to engage the first mentioned thread-leading means for relatively axially displacing the spindle and the work responsive to relative rotation of the thread-leading means, a rotary driving connection for the spindle including a clutch actuated by fluid pressure, the clutch being yieldable for disengaging the driving connection responsive to torque resistance of the spindle exceeding the fluid pressure, means for regulating the fluid pressure to limit torque capacity of the spindle, and means for indicating the regulated torque capacity.

10. In a machine tool, a rotatable tapping spindle, thread-leading means associated with the spindle, a clutch member surrounding the spindle and rotatable relative thereto, means for rotating the clutch member, a second clutch member surrounding the spindle and fixed for rotation with but axially displaceable relative to the spindle, a piston having the second clutch member journaled therein and fixed for axial displacement with said second clutch member, a cylinder for the piston, and means for selectively exerting fluid pressure in the cylinder at respective faces of the piston for axially moving the piston and the second clutch member for operatively engaging or disengaging the clutch members.

11. In a thread-leading means, relatively rotatable interfitting threaded-guides, a pivotal mounting for one of the guides, a link having a lost-motion connection with said pivotal mounting for pivoting said mounting so as to engage the threaded-guides and providing play between said mounting and said link when the threaded-guides are engaged, and a spring cooperating with the lost-motion connection and operable as a result of said play for pivoting the mounting relative to said link so as to tension engagement of the threaded-guides.

12. In a threading machine, relatively rotatable and axially alined cooperating elements comprising a tool holder and a work holder, a rotatable and axially displaceable spindle having one of said elements concentrically mounted at one end of the spindle and adapting the tool and the work for telescopic thread-cutting engagement, cooperating threaded elements separate and distinct from the work and adapted for threaded engagement for thread-leading the spindle, one of the threaded elements being fixed to the spindle, a mounting fixing the other threaded element against movement circumferentially or axially of the spindle, said mounting being shiftable for moving said other threaded element radially of the spindle for threaded engagement or disengagement of the cooperating threaded elements, and means for shifting the mounting to cause said engagement or disengagement.

13. In a threading machine, relatively rotatable and axially alined cooperating elements comprising a tool holder and a work holder, a rotatable and axially displaceable spindle having one of said elements concentrically mounted at one end of the spindle and adapting the tool and the work for telescopic thread-cutting engagement, cooperating threaded elements separate and distinct from the work and adapted for threaded engagement for thread-leading the spindle, one of the threaded elements being fixed to the spindle, a mounting fixing the other threaded element against movement circumferentially or axially of the spindle, said mounting being shiftable for moving said other threaded element radially of the spindle for threaded engagement or disengagement of the cooperating threaded elements, and controlling means operable responsive to predetermined axial displacement of the spindle for shifting the mounting for disengaging the cooperating threaded elements.

14. In a threading machine, relatively rotatable and axially alined cooperating elements comprisin a tool holder and a work holder, a rotatable and axially displaceable spindle having one of said elements concentrically mounted at one end of the spindle and adapting the tool and the work for telescopic thread-cutting engagement, cooperating threaded elements separate and distinct from the work and adapted for threaded engagement for thread-leading the spindle, one of the threaded elements being fixed to the spindle, a mounting fixing the other threaded element against movement circumferentially or axially of the spindle, said mounting being shiftable for moving said other threaded element radially of the spindle for threaded engagement or disengagement of the cooperating threaded elements, and controlling means for dependently starting rotation of the spindle and shifting the mounting for engaging the cooperating threaded elements.

15. In a threading machine, relatively rotatable and axially alined cooperating elements comprising a tool holder and a work holder, a rotatable and axially displaceable spindle having one of said elements concentrically mounted at one end of the spindle and adapting the tool and the work for telescopic thread-cutting engagement, cooperating threaded elements separate and distinct from the work and adapted for threaded engagement for thread-leading the spindle, one of the threaded elements being fixed to the spindle, and a mounting fixing the other threaded element against movement circumferentially or axially of the spindle, said mounting being shiftable for moving said other threaded element radially of the spindle for threaded engagement of the cooperating threaded elements, the shiftable mounting including means permitting floating movement of said other threaded element throughout said threaded engagement, and the shiftable mounting including means operative throughout said threaded engagement for urging shifting of said mounting for maintaining snug threaded engagement.

16. In a threading machine, relatively rotatable and axially alined cooperating elements comprising a tool holder and a work holder, a rotatable and axially displaceable spindle having one of said elements concentrically mounted at one end of the spindle and adapting the tool and the work for telescopic thread-cutting engagement, cooperating thread-leading elements separate and distinct from the work, one of said elements being a threaded element fixed to the spindle and having a thread-cutting portion and a pilot-thread portion axially one beyond another, the other thread-leading element comprising a plurality of blocks, mountings for the blocks fixing the same against movement circumferentially or axially of the spindle, said mountings being shiftable for moving the blocks radially of the spindle for disengagement from the threaded element or for circumferentially spaced engagement with the threaded element at opposite sides of a diametrical plane of the spindle, and means for shifting the mountings for causing said engagement or disengagement, the blocks being adapted for engagement with the thread-cutting portion of the threaded element for threading the blocks, and the threaded blocks being adapted for engagement with the pilot-thread portion of the threaded element for thread-leading the spindle.

17. In a threading machine, relatively rotatable and axially alined cooperating elements comprising a tool holder and a work holder, a rotatable and axially displaceable spindle having one of said elements concentrically mounted at one end of the spindle and adapting the tool and the work for telescopic thread-cutting engagement, cooperating thread-leading elements separate and distinct from the work, one of said elements being a threaded element fixed to the spindle and having a thread-cutting portion and a pilot-thread portion axially one beyond another, the other thread-leading element comprising a plurality of blocks, arms supporting the blocks and fixing the same against movement circumferentially or axially of the spindle, said arms being shiftable for moving the blocks radially of the spindle for disengagement from the threaded element or for circumferentially spaced engagement with the threaded element at opposite sides of a diametrical plane of the spindle, and actuating means having connections with the arms for shifting the same for causing said engagement or disengagement, said connections permitting play between the actuating means and the arms for floating movement of the blocks throughout their engagement with the threaded element, and said connections including spring means operative throughout said engagement for urging shifting of the arms for maintaining snug engagement, the blocks being adapted for engagement with the thread-cutting portion of the threaded element for threading the blocks, and the threaded blocks being adapted for engagement with the pilot-thread portion of the threaded element for thread-leading the spindle.

18. In a tapping machine, a rotatable tapping spindle, a thread-leading element of substantially tubular form secured to the tapping spindle, blocks cooperating with the thread-leading element, the thread-leading element having a peripheral gauging diameter at one end, against which the blocks may be set and gauged, a thread-cutting portion adjacent the peripheral gauging diameter, adapted to thread the blocks, and a pilot-thread portion adjacent the thread-cutting portion, forming thread-leading means when in threaded engagement with the threaded blocks.

19. In a tapping machine, a rotatable tapping spindle, a motor drive for the spindle, a tubular thread-leading pilot secured to the spindle, a plurality of thread-leading pilot blocks normally disengaged from the tubular pilot, and means for engaging the pilot blocks with the tubular pilot and simultaneously starting the motor to cause rotation of the spindle.

HARDING F. BAKEWELL.